United States Patent [19]

Bishop

[11] Patent Number: 5,249,364
[45] Date of Patent: Oct. 5, 1993

[54] FRONT AXLE TOE-IN INSPECTION PROCESS AND APPARATUS

[75] Inventor: Craig A. Bishop, Fort Wayne, Ind.

[73] Assignee: Dana Corporation, Toledo, Ohio

[21] Appl. No.: 773,244

[22] Filed: Oct. 9, 1991

Related U.S. Application Data

[63] Continuation-in-part of Ser. No. 529,135, May 25, 1990, Pat. No. 5,084,979.

[51] Int. Cl.⁵ .............................................. G01B 7/315
[52] U.S. Cl. .................................. 33/193; 33/203.18
[58] Field of Search ................ 33/203, 203.18, 203.19, 33/203.2, 1 N, 1 L, 707, 193

[56] References Cited

U.S. PATENT DOCUMENTS

| | | |
|---|---|---|
| 534,820 | 2/1985 | Doane . |
| 550,061 | 11/1985 | Simpson . |
| 806,682 | 12/1905 | Kurt . |
| 1,206,476 | 11/1916 | Snyder . |
| 1,670,889 | 5/1928 | Hartell . |
| 1,822,599 | 9/1931 | Monk . |
| 1,908,317 | 5/1933 | Cadwell et al. . |
| 1,922,344 | 8/1933 | Bagge . |
| 2,003,188 | 5/1935 | Heid . |
| 2,235,383 | 5/1941 | O'Donnell . |
| 2,616,186 | 11/1952 | Shooter et al. . |
| 2,619,731 | 12/1952 | Zenz, Sr. . |
| 2,704,894 | 3/1955 | Rogers . |
| 2,793,736 | 5/1957 | Thompson . |
| 2,907,115 | 10/1959 | Bender . |
| 3,182,405 | 5/1965 | Taylor . |
| 3,409,991 | 11/1968 | Davis et al. . |
| 3,417,479 | 12/1968 | Hirmann . |
| 3,566,476 | 3/1971 | McWhorter . |
| 3,892,042 | 7/1975 | Senften . |
| 3,977,067 | 8/1976 | LaValley . |
| 4,037,325 | 7/1977 | Webber et al. . |
| 4,138,825 | 2/1979 | Pelta . |
| 4,192,074 | 3/1980 | Chang . |
| 4,236,315 | 12/1980 | Curchod et al. . |
| 4,574,490 | 3/1985 | Curchod .................... 33/203.18 |
| 4,594,789 | 6/1986 | Marino et al. .............. 33/203.18 |
| 4,615,618 | 10/1986 | Bailey et al. . |
| 4,835,714 | 5/1989 | Sano et al. . |
| 4,856,199 | 8/1989 | Merrill et al. . |
| 4,860,457 | 8/1989 | Beissarth . |
| 4,863,266 | 9/1989 | Masuko et al. . |
| 4,879,670 | 11/1989 | Colarelli, III . |
| 4,880,072 | 11/1989 | Sakamoto et al. . |
| 4,889,425 | 12/1989 | Edwards et al. . |
| 4,898,464 | 2/1990 | Thorne et al. . |
| 4,899,218 | 2/1990 | Waldecker et al. . |
| 4,901,442 | 2/1990 | Fujii . |
| 4,931,964 | 6/1990 | Titsworth et al. . |
| 4,953,296 | 9/1990 | Spainhour . |
| 4,977,524 | 12/1990 | Strege et al. . |

FOREIGN PATENT DOCUMENTS

1330404 9/1973 United Kingdom.

Primary Examiner—Thomas B. Will
Attorney, Agent, or Firm—William J. Clemens

[57] ABSTRACT

An apparatus for inspecting the toe-in for a vehicle front axle assembly includes a fixture having a pair of clamps for engaging the axle spindles. The fixture is adjustable to accommodate different length axles and one of the clamps is rotatable to accommodate the toe-in setting. A position indicator is attached to one of the clamps and a position sensor is attached to the other clamp for generating an actual value signal representing the toe-in setting. A bar code reader scans labels on the axle parts to generate an identification signal to a computer. The computer compares the actual toe-in value signal with a desired toe-in value associated with the identification signal in storage to determine whether the axle is "good" or "bad" and generate an appropriate visual display. A label with manufacturing data is printed and attached to "good" axles.

20 Claims, 5 Drawing Sheets

FRONT AXLE TOE-IN INSPECTION PROCESS AND APPARATUS

This application is a continuation-in-part of U.S. patent application Ser. No. 07/529,135 filed on May 5, 1990, now U.S. Pat. No. 5,084,979.

BACKGROUND OF THE INVENTION

The present invention relates generally to a process and an apparatus for setting the toe-in/out of vehicle wheels and, in particular, to a process and apparatus for inspecting the toe-in/out on a vehicle front axle assembly during manufacture.

Toe-in and toe-out are defined as the distance between the front edges of the front wheels of a vehicle being shorter and longer respectively than the distance between the rear edges of those wheels. Vehicle front wheels are typically adjusted to a toe-in position and herein the term toe-in may be utilized to refer to both an actual toe-in position and any position from maximum toe-in to maximum toe-out. In the past, vehicle front wheel toe-in settings have been performed by a variety of methods. Initially, mechanical devices were attached to the spindles, wheel rims or brake backing plates for the measurement of the toe-in or toe-out. For example, an elongated paddle extending in a horizontal direction was attached to each of the axle spindles. Separate length measurements were taken at the front ends of the paddles and at the rear ends of the paddles using a tape measure and the difference between these two measurements was the toe-in or toe-out setting.

Another prior art method involved engaging the spindle or rim of each front wheel and measuring the angular deviation from a line parallel to the longitudinal axis of the vehicle with a mechanical linkage and pointer. In one such device, the pointer was replaced by a potentiometer for generating an electrical signal representing the measured angle.

Alternatively, the wheel rim or spindle was engaged by a level or inclination detector utilizing liquid or air to support an indicator of toe-in or toe-out of the wheels. In one form, electrodes were immersed in the liquid to generate electrical signals indicating the angle with respect to the wheel. Other prior art devices engaged the wheels with mechanical linkages coupled to mirrors for sighting reference lines or reflecting light beams.

Since the front wheel toe-in influences the steering stability and riding qualities of a vehicle and has a direct effect on tire wear, it is important to properly set the toe-in on an axle assembly line before the axle is installed in the vehicle. However, most of the devices and methods described above lack the necessary close tolerance required for current axle assembly procedures and may require two operators. Furthermore, since pointers, level detectors and line of sight techniques are utilized in those devices, the operator's judgement as to when correct alignment has been achieved is relied upon. One attempt to solve the above-identified problems in an axle assembly line involved an apparatus which referenced from the brake backing plate mounting surfaces of a front axle assembly for sensing and indicating whether the assembly, including an I-beam type front axle and a tie rod, initially has too much or too little toe-in, with provisions for sensing and indicating any change thereto resulting from manual manipulation of the tie rod. Such an apparatus was lowered by an operator onto the spindles of a front axle assembly, slid inwardly along the spindles and clamped against the oppositely disposed brake backing plate mounting surfaces. Air sensing means sensed the actual toe-in relationship between the two mounting surfaces, and visual indicators displayed such toe-in relationship to the operator. As the operator rotated the tie rod, the changes in the angular positions of the backing plates were conveyed to the operator through the display.

One disadvantage of the last described device is that after it is lowered into position over the spindles, clamping mechanisms must be slid into place and clamped on the brake backing plates before measurements can be made. This process is reversed after the measurements are made in order to remove the measured axle and replace it with a new axle. Such operation tends to slow down the axle assembly production process. In addition, the measurements of toe-in are made from the brake backing surfaces. Although these surfaces are machined perpendicular to the longitudinal axis of the associated spindle, the wheel will be mounted on the outside surface of the spindle and a more accurate measurement could be made from such surface.

SUMMARY OF THE INVENTION

The present invention concerns a method and an apparatus for inspecting the toe-in setting of the wheels on an axle assembly. The apparatus includes a fixture having a pair of clamping assemblies adapted to engage axle spindles, an elongated frame member having one of the clamping assemblies fixedly attached to an outer end thereof, and a pivot bracket having the other one of the clamping assemblies pivotally attached thereto. The frame member and the pivot bracket are coupled for relative movement to accommodate different length axles.

An arc arm is coupled for co-rotation with the pivotally mounted clamping assembly and a position indicator is mounted on the arc arm and has a plurality of indicator marks formed thereon. A position sensor is mounted on the frame member for reading the indicator marks whereby when the clamping assemblies engage a pair of axle spindles of a vehicle axle, the position sensor generates a signal to a data processor and a control panel which indicates a toe-in setting of the spindles.

The apparatus also includes a bar code reader for identifying the components used to assemble the axle. The data processor stores a desired value for the toe-in setting associated with each of a plurality of different axles and the combination of components required to assemble each of the axles. The data processor inputs the information read from the bar code labels and the actual toe-in value for the axle being inspected. The data processor identifies the axle being inspected and compares the actual toe-in value with the stored desired toe-in value. The result of the comparison is displayed as a "good" or "bad" toe-in message to the operator.

The invention also concerns a process or method for inspecting the toe-in setting. When the toe-in setting of an axle is to be checked, the distance between the clamping assemblies is adjusted to accommodate the axle length and the position sensor and the position indicator are positioned at the center of the fixture. The fixture is held in a raised position with the clamping assemblies open. The axle to be checked is positioned beneath the fixture and the fixture is lowered until the axle spindles engage the jaw pads of the clamping assemblies. The clamping assemblies are closed forcing relative rotation between the frame member and the arc arm. The sensor reads the indicator marks on the position indicator and generates a signal to the data processor which converts the signal to a visual display of the actual value of the toe-in setting at the control panel. A bar code reader is utilized by the operator to input the axle component identifications to determine the identity of the axle and the stored desired toe-in value. If the actual value corresponds to the desired value, a "good" message is displayed.

If the actual value does not correspond to the stored desired value, a "bad" message is displayed and the tie rod is adjusted until the "good" message is displayed. The tie rod adjustment means is then clamped in place to preserve the toe-in setting. The clamping assemblies are released and the fixture is raised clear of the axle which is removed. The actual value is stored in the data processor and a label is printed for the axle with information such as a number identifying the axle and the actual toe-in value. The fixture is then ready to receive the next axle to be inspected.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
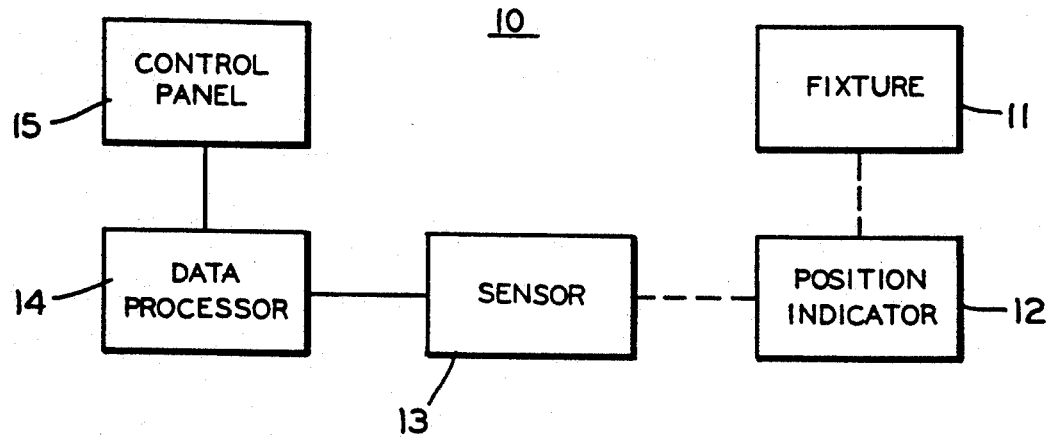
FIG. 1 is a block diagram of an apparatus for performing a process of setting vehicle axle toe-in in accordance with the present invention.

As shown in the FIG. 1, an apparatus 10 for indicating the toe-in of a vehicle front axle in accordance with the present invention includes a fixture 11 for engaging a front axle (not shown) and an associated toe-in position indicator 12. The position indicator 12 is coupled to the spindles of the front axle through the fixture 11 to provide a mechanical indication of the value of the toe-in setting. The mechanical indication of the position indicator 12 is read by a sensor 13 which generates an electrical output signal representing the value of the toe-in setting. The signal from the sensor 13 is an input to a data processor 14 which is connected to a control panel 15 for use by an operator for reading the actual toe-in value and for setting the desired toe-in value.

Figure 3:
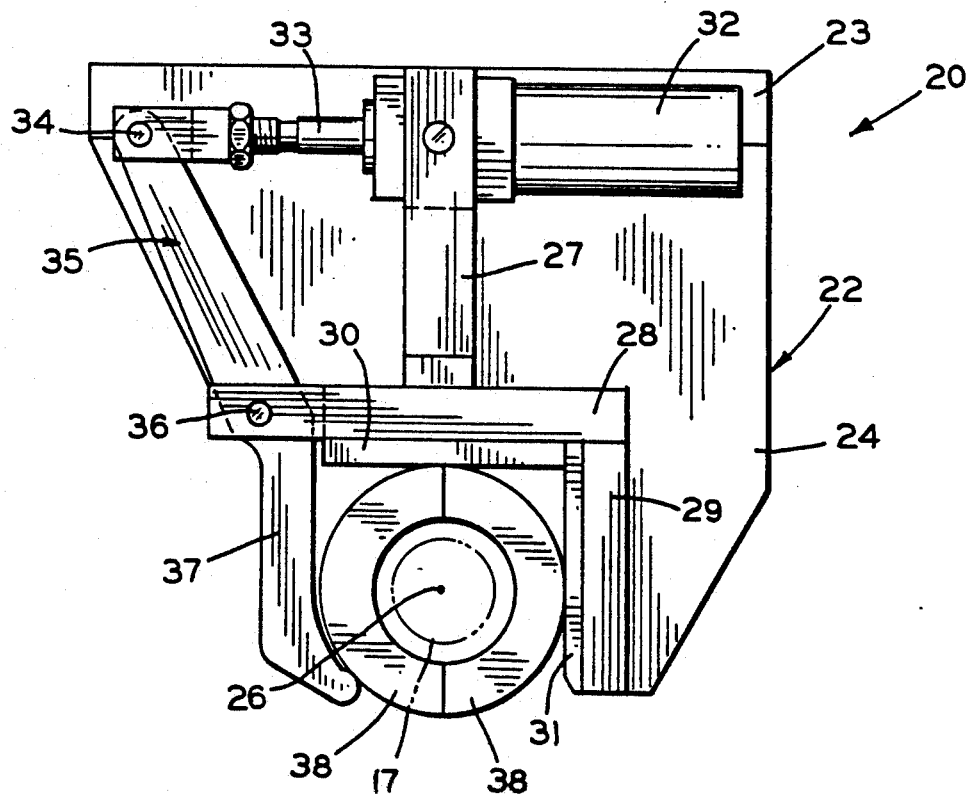
FIG. 3 is an enlarged right side elevational view of the portions of the apparatus as if taken along the line 3—3 in the FIG. 2.
Figure 2:
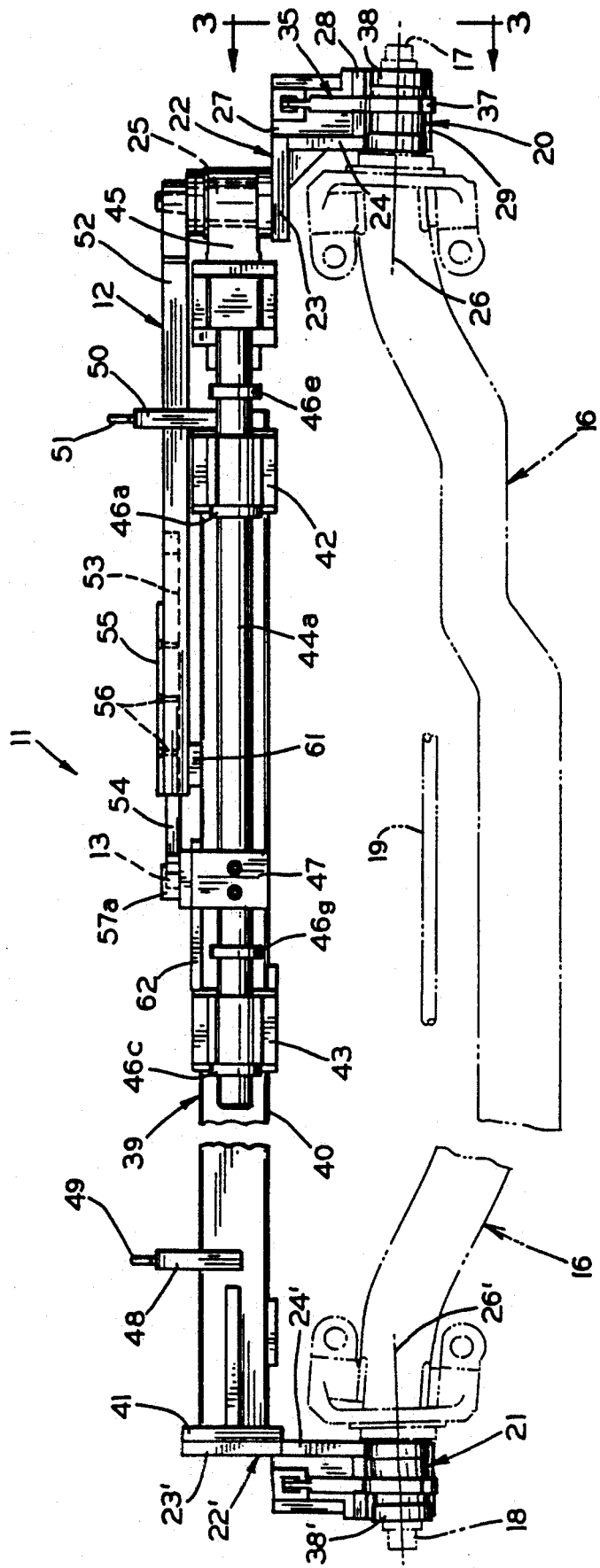
FIG. 2 is a front elevational view of the fixture, position indicator and sensor portions of the apparatus shown in the FIG. 1.

A portion of the apparatus 10 including the fixture 11, the position indicator 12 and the sensor 13 is shown in the FIG. 2 with a vehicle front axle 16 in phantom so as not to obscure the invention. The axle 16 is viewed from behind, as if from the rear of a vehicle, and attached to opposite ends of the axle 16 are a right end spindle 17 and a left end spindle 18 for mounting a pair of wheels (not shown). The spindles 17 and 18 are connected to a tie rod 19 (fragmentary view) for adjusting the value of the toe-in setting. The right spindle 17 can be engaged by a right clamping assembly 20, also shown in the FIG. 3, and the left spindle 18 can be engaged by a left clamping assembly 21, the clamping assemblies 20 and 21 being included in the fixture 11. As shown in the FIGS. 2 and 3, the right clamping assembly 20 includes an inverted generally L-shaped bracket 22 having a generally horizontally extending, planar leg 23 attached to a generally vertically extending, planar leg 24. An inwardly facing end of the leg 23 is fixedly attached to a lower end of a generally vertically extending shaft 25 for pivotal movement as described below.

The leg 24 extends in a plane which is generally perpendicular to a longitudinal axis 26 of the spindle 17. Attached to an outer surface of the leg 24 is an actuator mounting plate 27 which extends in a generally vertical plane which includes the longitudinal axis 26. Also extending outwardly from the leg 24 is a generally horizontally extending clamping arm mounting plate 28 and a generally vertically extending fixed jaw plate 29. The bracket 22, and the plates 27, 28 and 29, are typically formed of a strong metal material such as steel. Replaceable jaw pads 30 and 31, also formed of steel, are attached to the surfaces of the plates 28 and 29 respectively which face the spindle 17 by any suitable means such as threaded fasteners (not shown).

Attached to the mounting plate 27 is an actuator 32, typically a pneumatic cylinder from which extends an actuating rod 33. A free end of the rod 33 is pivotally connected at a point 34 to an upper end of a movable clamp arm 35. The arm 35 has a central portion pivotally attached to the clamping arm mounting plate 28 at a point 36. A lower end of the arm 35 forms a moveable jaw 37 which cooperates with the fixed jaw 29 and the clamping arm mounting plate 28 to secure the spindle 17.

When the spindle 17 is to be clamped, a split bushing 38 is placed about the outer surface of the spindle 17. The rod 33 is retracted into the cylinder of the actuator 32 pivoting the arm 35 about the pivot point 36 and moving the moveable jaw 37 away from the spindle 17. The fixture 11 with the right clamp assembly 20 can then be lowered over the spindle 17 and split bushing 38 until the upper outer surface of the split bushing 38 contacts the liner 30. The actuator 32 is activated to extend the rod 33 thereby rotating the arm 35 and bringing the moveable jaw 37 into contact with the split bushing 38 until the split bushing 38 and the spindle 37 are firmly clamped between the moveable jaw 37 and the liner 31 of the fixed jaw plate 29. The left clamping assembly 21 is similar to the right clamping assembly 20 and operates in a similar manner to firmly clamp the left end spindle 18 in a split bushing 38'.

The clamping assemblies 20 and 21 are attached to opposite ends of a variable length frame 39. The frame 39 includes a generally horizontally extending, elongated box section frame member 40. Attached to a left end of the member 40 is a generally vertically extending mounting plate 41. The left clamping assembly 21 includes a bracket 22' similar to the bracket 22 described above with the exception that a leg 23' extends in a generally vertical direction in the same plane as a vertically extending leg 24' which is similar to the leg 24. The leg 24' extends in a plane which is generally perpendicular to a longitudinal axis 26' of the spindle 18. The leg 23' is attached to the mounting plate 41 by any suitable means such as threaded fasteners (not shown).

Figure 4:
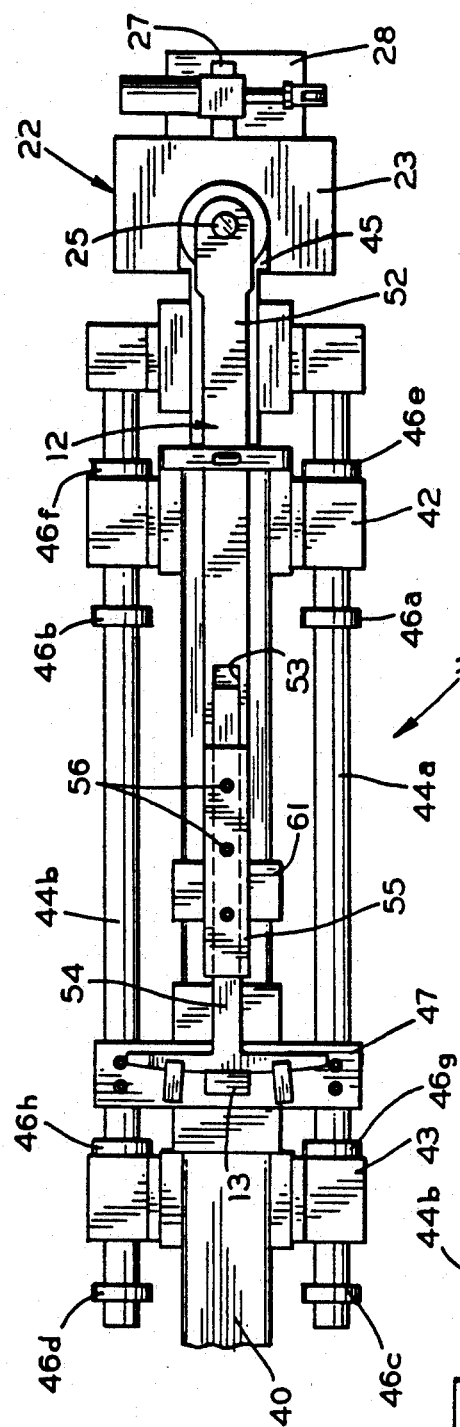
FIG. 4 is a fragmentary top plan view of the right end portion of the apparatus shown in the FIG. 2.

As shown in the FIGS. 2 and 4, attached to the right end of the frame member 40 is a sleeve bearing mounting bracket 42, and spaced from the bracket 42 and attached to the member 40 is a second sleeve bearing mounting bracket 43. A pair of rods 44a and 44b are positioned in front of and behind the member 40 respectively, each of the rods 44a and 44b having a longitudinal axis extending generally parallel to the longitudinal axis of the member 40. A right end of each of the rods 44a and 44b is attached to a pivot bracket 45 in which the shaft 25 is rotatably mounted. The rods 44a and 44b slidably extend through both of the mounting brackets 42 and 43 thereby forming a Thompson bearing assembly to permit variance of the horizontal distance between the right clamp assembly 20 and the left clamp assembly 21 in order to accommodate different lengths of axles.

In the FIG. 2, the fixture 11 is shown in the widest or fully extended position with stop means 46a and 46c mounted on the rod 44a and abutting the left side of each of the mounting brackets 42 and 43 respectively. Corresponding stops 46b and 46d are attached to the rod 44b as shown in the FIG. 4. In the FIG. 4, the fixture 11 is shown in the narrowest or fully closed position with stop means 46e and 46g mounted on the rod 44a and abutting the right side of each of the mounting brackets 42 and 43 respectively. Corresponding stops 46f and 46h are attached to the rod 44b. A support 47 for the sensor 13 is positioned adjacent the stops 46g and 46h and includes sleeve bearings (not shown) for coupling to the rods 44a and 44b as described below.

As best shown in the FIG. 2, the fixture 11 includes means for lowering toward and raising away from the axle 16. The axle 16 can be supported from below by any suitable means (not shown) permitting positioning under the fixture 11 which is shown in the lowered position. A support bracket 48 is attached to the member 40 adjacent the left end and an eye bolt 49 is attached to and extends upwardly from the bracket 48. Similarly, a support bracket 50 is attached to the member 40 at the mounting bracket 42 and an eye bolt 51 is attached to and extends upwardly from the bracket 50. The eye bolts 49 and 51 provide locations for attaching a hoist (not shown) to raise and lower the fixture 11.

Figure 5:
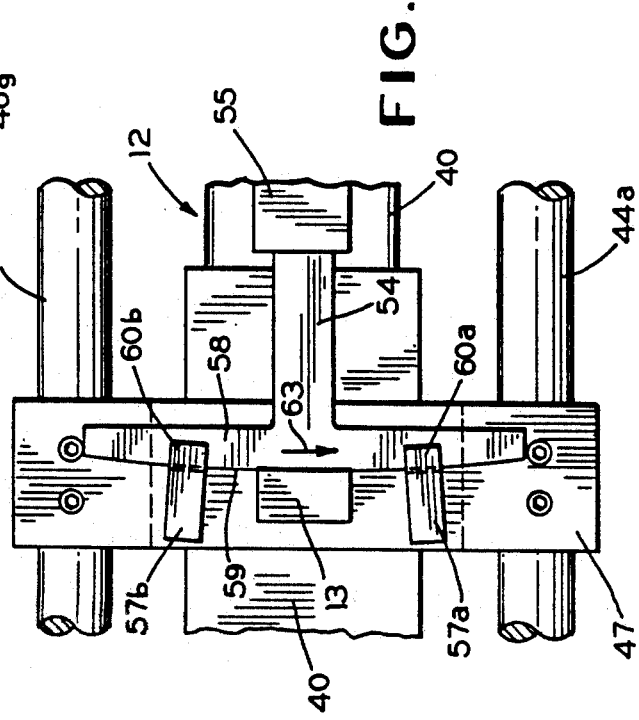
FIG. 5 is a enlarged fragmentary top plan view of the sensor portion of the apparatus shown in the FIG. 4.

The position indicator 12 and the sensor 13 of the FIG. 1 are shown in more detail in the FIGS. 2, 4 and 5. The position indicator 12 includes an arc arm 52 having a right end fixedly attached to an upper end of the shaft 25. Thus, as the shaft 25 pivots in the pivot bracket 45, the arc arm 52 maintains a fixed relationship with respect to the right clamping assembly 20 indicating the angle between the longitudinal axis 26 of the spindle 17 and the longitudinal axis 26' of the spindle 18 in a horizontal plane. The opposite end of the arm 52, the left end, has a longitudinally extending, upwardly facing slot 53 formed therein. Extending into the open end of the slot 53 is a generally T-shaped position indicator arm 54. The arm 54 is retained in the slot 53 by a cover plate 55 attached to the upper surface of the arm 52. When the left or head end of the arm 54 is moved to a position adjacent the sensor 13, one or more set screws 56 threadably retained in the cover plate 55 can be screwed into engagement with an upper surface of the indicator arm 54 to lock it in place.

Mounted on an upper surface of the support 47 is the sensor 13 and a pair of guide blocks 57a and 57b. A head 58 of the indicator arm 54 has a generally vertically extending end surface 59 which defines an arc in a horizontal plane at a radius extending from the pivot axis of the shaft 25. The sensor 13 is generally positioned along the longitudinal axis of the member 40 adjacent the path of travel of the curved surface 59. The guide blocks 57a and 57b are spaced from the sensor 13 on either side thereof and each of the guide blocks, 57a and 57b, has a generally horizontally extending flange, 60a and 60b respectively, formed thereon which extends over the upper surface of the head 58. Thus, the head 58 is positioned between an upper surface of the support 47 and the lower surfaces of the flanges 60a and 60b. Mounted on an upper surface of the member 40 between the mounting bracket 42 and the support 47 is a bearing block 61. The bearing block 61 slidably supports the left end of the arc arm 52 for pivotal movement and also supports the head 58 spaced from the upper surface of the support 47 and the lower surfaces of the flanges 60a and 60b.

The support 47 rests on a bearing block 62 which is attached to the upper surface of the frame member 40. The sensor 13 and the head 58 must be positioned half way between the clamping assemblies 20 and 21 to provide an accurate indication of toe-in. Therefore, when the distance between the clamping assemblies is changed, the support 47 is released, repositioned along the rods 44a and 44b, and reclamped. The arm 54 also must be moved by loosening the screws 56, sliding the arm 54 in the slot 53, and retightening the screws 56.

Figure 6:
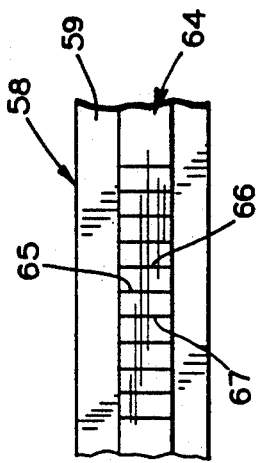
FIG. 6 is an enlarged fragmentary left side elevational view of the position indicator shown in the FIG. 5.

In the FIG. 2, if we assume that the rear side of the axle 16 is facing us, a toe-in setting will be indicated when the head 58 of the indicator arm 54 is shifted from a position shown in the FIG. 5 in a counter clockwise direction as shown by an arrow 63. Conversely, a toe-out setting would be indicated by the head 58 shifting in a clockwise direction from the position shown in the FIG. 5. In the FIG. 6, there is shown an enlarged fragmentary front elevational view of the curved surface 59 of the head 58. Mounted on the surface 59 and extending in a generally horizontal direction is a suitable indicia means 64 such a metallic tape formed of a gold material. The tape 64 has indicia in the form of a plurality of generally vertically extending optically readable indicator marks formed therein. For example, an indicator mark 65 can represent a zero point wherein the longitudinal axis of the indicator arm 54 is aligned with the longitudinal axis of the member 40. If an axle were clamped in the fixture 11, such a position would indicate that the longitudinal axis of each of the associated spindles was aligned with the longitudinal axis of the axle for a zero or no toe-in or toe-out setting.

Equally spaced from and on opposite sides of the mark 65 are positioned a pair of indicator marks 66 and 67. If the right clamping assembly 20 has been rotated in a clockwise direction with respect to the left clamping assembly 21, such that the mark 66 is aligned with the center of the sensor 13, a toe-out setting is indicated and the mark 66 represents a predetermined value of toe-out. Conversely, if the clamping assembly 20 is rotated in a counter clockwise direction with respect to the clamping assembly 21, and the mark 67 is aligned with the center of the sensor 13, a toe-in setting is indicated in a predetermined amount. For example, the marks 66 and 67 can each represent one degree of toe-out and toe-in respectively. Of course, any number of the marks can be provided as required to indicate the maximum settings utilized and the marks can be spaced closer together or farther apart representing increments other than one degree. Furthermore, the sensor 13 and the tape 64 are representative of any suitable angular position indicating means and the sensor 13 could be mounted on the head 58 and the tape 64 mounted on the support 47.

When the toe-in setting of an axle is to be checked, the distance between the clamping assemblies 20 and 21 is adjusted to accommodate the axle length and the sensor 13 and the head 58 are positioned at the center of the fixture 11. The fixture 11 is held in a raised position with the clamping assemblies 20 and 21 open. The axle to be checked is positioned beneath the fixture 11 and the fixture is lowered until the axle spindles engage the jaw pads of the clamping assemblies. The clamping assemblies are closed forcing relative rotation between the frame member 40 and the arc arm 52. The sensor 13 reads the indicator marks on the head 58 and generates a signal to the data processor 14 which converts the signal to a visual display of the actual value of the toe-in setting at the control panel 15. If the actual value does not correspond to the desired value, the tie rod is adjusted until the desired value is displayed. The tie rod adjustment means is then clamped in place to preserve the toe-in setting. The clamping assemblies are released and the fixture 11 is raised clear of the axle which is removed. The fixture 11 is ready to receive the next axle to be checked.

Figure 7:
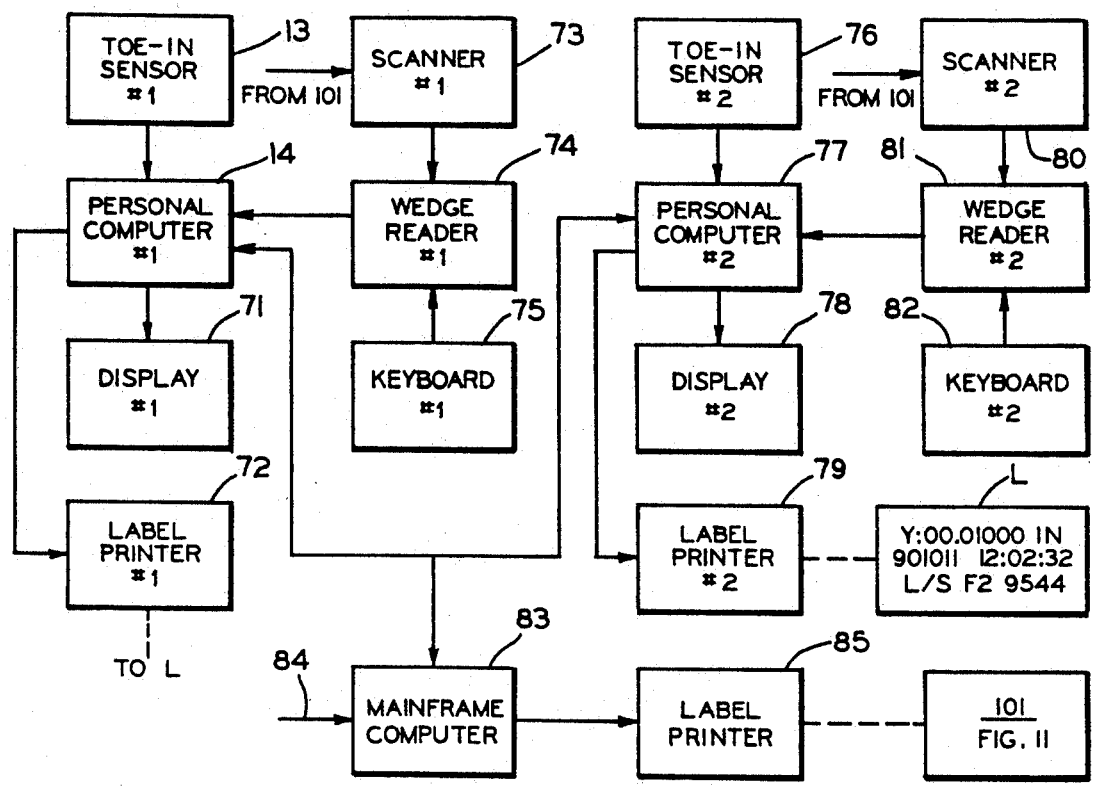
FIG. 7 is a block diagram of the toe-in inspection apparatus according to the present invention including the sensor and data processor shown in the FIG. 1 incorporated into an inspection system for a typical axle production line.

The present invention is shown in the FIG. 7 incorporated into an inspection system for a typical axle production line. The sensor 13 from the FIG. 1 is designated as a toe-in sensor #1 connected to an input of a personal computer #1 which can be the data processor 14 shown in the FIG. 1. The personal computer 14 has one output connected to a display #1 71 which can be a cathode ray tube monitor or similar visual display device. The personal computer 14 also has an output connected to a label printer #1 72 for printing a scanner #1 73 is connected to an input of a wedge reader #1 74 which has another input connected to a keyboard #1 75. An output from the wedge reader 74 is an input to the personal computer 14. The devices just described form an inspection station for a first production line in a typical axle production facility.

A second inspection station includes a toe-in-sensor #2 76 which is similar to the toe-in-sensor 13 and is connected to an input of a personal computer #2 77 which is similar to the personal computer 14. The personal computer 77 has an output connected to a display #2 78 which is similar to the display 71. The personal computer 77 also has a output connected to a label printer #2 79 which is similar to the label printer 72. A scanner #2 80 is similar to the scanner 73 and is connected to an input of a wedge reader #2 81 which is similar to the wedge reader 74. The wedge reader 81 has a second input connected to a keyboard #2 82 similar to the keyboard 75. The devices identified by "#2" form a second inspection station for a second axle production line in the typical axle production facility.

The axle production facility can be provided with a main frame computer 83 which receives instructions and data on an input line 84 from any one or more conventional input devices (not shown) such as a keyboard. Data which can be stored in the main frame computer 83 includes the various components which form different axle assemblies and the desired values of toe-in for each of those different axle assemblies. An output of the main frame computer 83 is connected to inputs of the personal computers 14 and 77. The data stored in the main frame computer 83 can be provided for storage in the personal computers 14 and 77 prior to the inspection process or the personal computers 14 and 77 can access the data stored in the main frame computer 83 on a real time basis as required. Furthermore, the actual toe-in values read by the sensors 13 and 76 can be passed to the main frame computer 83 by the personal computers 14 and 77. An output of the main frame computer 83 can be connected to an input of a label printer 85. The label printers 72 and 79 are utilized to print labels L which are affixed to the "good" axle assemblies when they are completed.

Figure 8:
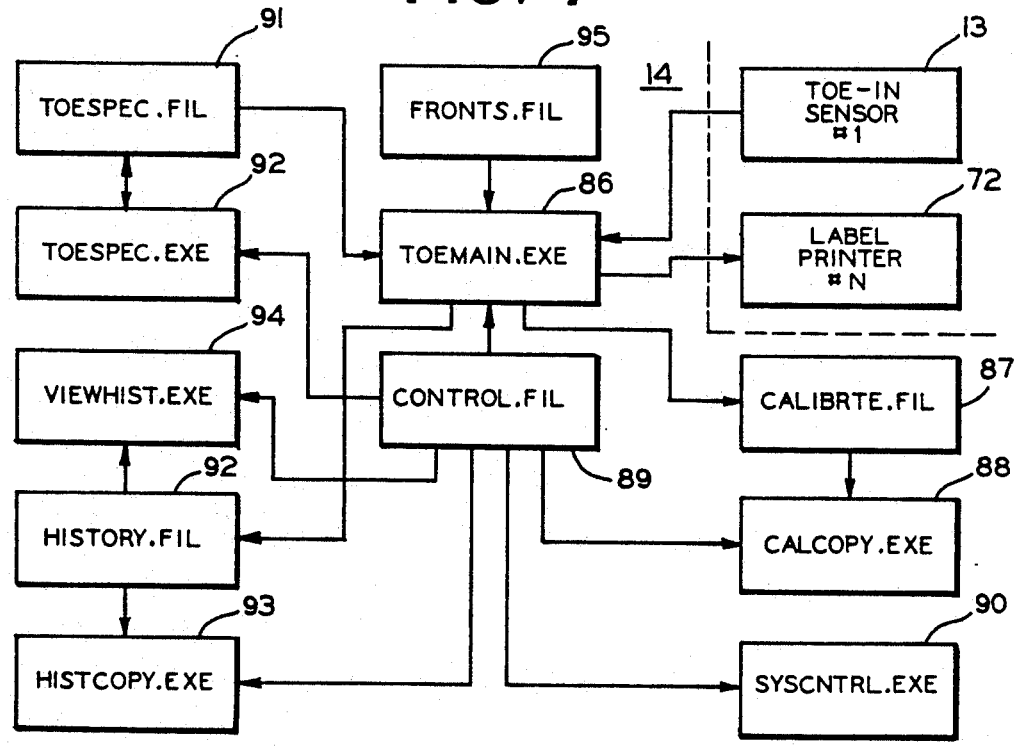
FIG. 8 is a block diagram showing the relationship of the computer programs and files utilized by the personal computers shown in the FIG. 7.

The FIG. 8 is a block diagram showing the relationship of the computer programs and files utilized by the personal computers 14 and 77 used in the FIG. 7. The computer 14 is used as an example and the toe-in sensor 13 is connected to an input and the label printer 72 is connected to an output of the personal computer 14. The personal computer 14 stores a program TOEMAIN.EXE 86 which verifies the actual toe-in value with the stored desired value of toe-in. This program also records calibration values received from the toe-in sensor during calibration of the toe-in apparatus. These calibration values are outputted to a file CALIBRTE.FIL 87 wherein the values are stored in the file until required.

The files shown in the FIG. 8 are labeled in conventional fashion. Each filename has two parts; a filename and a filename extension. The filename can be from one to eight characters long. The filename extension begins with a period followed by three or fewer characters. In the following, each file with the filename extension ".EXE" is a program to be run by the computer 14. Each file with the filename extension ".FIL" is a data file for storing data to be used by the programs.

A program CALCOPY.EXE 88 copies the contents of the data file CALIBRTE.FIL 87 to a text file (not shown) for outputting to the display 71 or to the main frame computer 83 of the FIG. 7. The program TOEMAIN.EXE 86 and the program CALCOPY.EXE 88 both are run under the direction of a set of instructions in a data file CONTROL.FIL file 89. The data file CONTROL.FIL 89 also controls the running of a program which defines file locations and is known as a program SYSCNTRL.EXE 90.

The toe-in specifications are stored in a data file TOESPEC.FIL 91 which provides the stored data to the program TOEMAIN.EXE 86. The data file TOESPEC.FIL 91 can also receive information from and send information to a program TOESPEC.EXE 92 which provides maintenance for the toe-in specifications data file 91 under the control of the program stored in the file CONTROL.FIL 89.

A data file HISTORY.FIL 92 receives actual toe-in value data from the program TOEMAIN.EXE 86 which data can be in the form of a desired value with minus and plus limits such as ∓0.015". A program HISTCOPY.EXE 93 copies the contents of the data file HISTORY.FIL 92 to a text file (not shown) for visual display on the display 71 of the FIG. 7 under the control of the program stored in the file CONTROL.FIL 89. A program VIEWHIST.EXE 94 displays the data file HISTORY.FIL 92 contents and permits a user to browse through the contents by item, date and by Comp No. The program VIEWHIST.EXE 94 is operated by the program in the file CONTROL.FIL 89. There is also a data file FRONTS.FIL 95 which stores information which is provided to the program TOEMAIN.EXE 86. The data file FRONTS.FIL 95 receives data from the main frame computer 83 shown in the FIG. 7.

Figure 9:
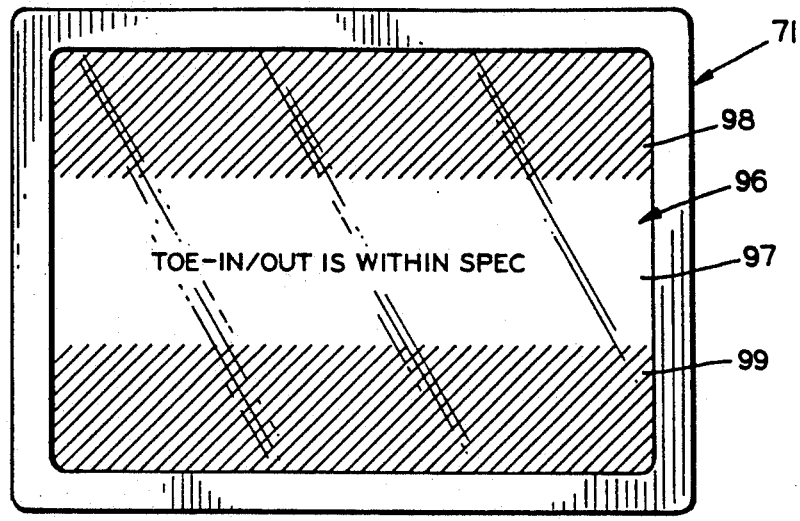
FIG. 9 is front elevational view of the display shown in the FIG. 7 with an inspection message screen.
Figure 10:
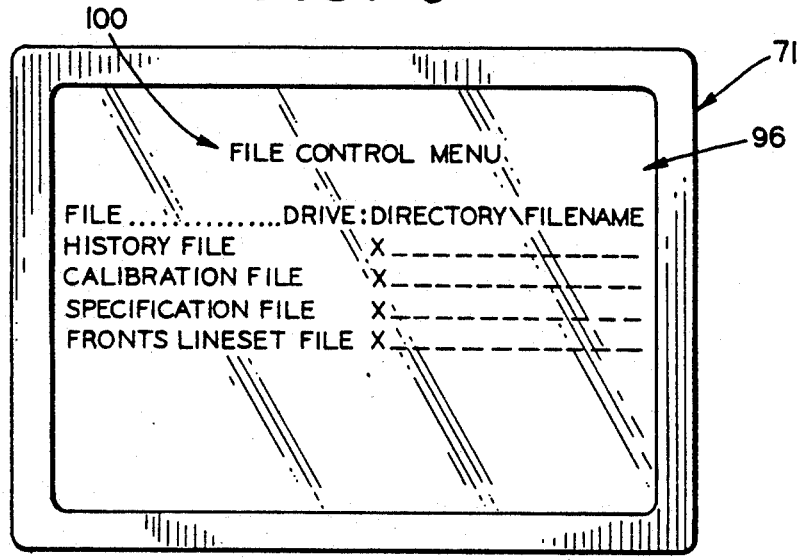
FIG. 10 is a front elevational view of the display shown in the FIG. 7 with a menu message screen.

There is shown in the FIGS. 9 and 10 two of the display screens generated by the personal computers 14 and 77 operating in accordance with the present invention. In the FIG. 9, the display 71 has a screen 96 which has been divided into a central message area 97 and upper and lower signal areas 98 and 99 respectively. When the actual value of the toe-in or toe-out reading is within the tolerance range for the desired value of the toe-in/out value, the personal computer 14 generates a message "TOE-IN/OUT IS WITHIN SPEC" in the message area 97. At the same time, the personal computer 14 can also generate a visual signal in the signal areas 98 and 99 such as a flashing green color indicating that the front axle being inspected has passed the inspection process. Conversely, when the actual value of the toe-in or toe-out is outside of the desired range, a message "TOE-IN/OUT IS OUT OF SPEC" can be generated in the message area 97. Such a message can be accompanied by a flashing red signal in the signal areas 98 and 99.

There is shown in the FIG. 10 the display 71 with the screen 96 showing a different message 100. The message 100 is a typical menu for selecting the files to be accessed. Under the heading "FILE CONTROL MENU", there is a column "FILE" for a description of the file and a column "DRIVE:DIRECTORY/FILE NAME" for listing the file name and directory location of the associated file. The file "HISTORY FILE" refers to the data file HISTORY.FIL 92, the file "CALIBRATION FILE" refers to the data file CALIBRTE.FIL 87, the file "SPECIFICATION FILE" refers to the data file TOESPEC.FIL 91 and the file "FRONTS LINESET FILE" refers to the data file FRONTS.FIL 95.

Figure 11:
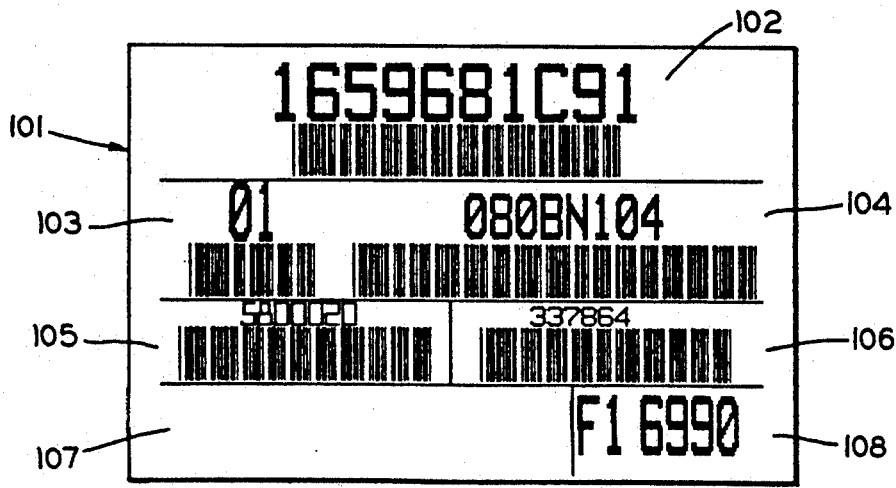
FIG. 11 is representation of a bar code label generated by the apparatus shown in the FIG. 7.

There is shown in the FIG. 11, a typical label 101 which can be generated by the label printer 85 shown in the FIG. 7. The label 101 displays manufacturing information in both bar code and alphanumeric form and is divided into several areas. Although the label 101 is illustrated for use with an axle, it is suitable for use on other manufactured parts and assemblies. Extending across the top of the label 101 is a part number area 102 for printing the part number of the customer for whom the axle has been manufactured. Below the area 102 and to the left is an area 103 for printing a number representing the quantity being marked by the label 101. In the case of an axle, the quantity will always be "01". On the same horizontal line and to the right of the area 103 is an area 104 for marking the manufacturer's part number.

Below the areas 103 and 104 is another horizontal line divided into a left hand portion 105 and a right hand portion 106. These areas are for a supplier number designation for the manufacturer of the axle which designation is selected by the customer for its internal use. At the bottom of the label 101 is a horizontal line having a left hand portion with an area 107 which is not used currently. A right hand portion of the bottom line has an area 108 for identifying the production line and the sequence number of the axle. For example, the designation "F1" can designate the production line associated with the toe-in sensor #1 13 and the number "6990" can designate the sequence of manufacture of the associated axle on the "F1" production line. The label 101 could be printed by the main frame printer 85 and applied to the axle immediately before the inspection is started.

Referring to the first production line associated with the scanner #1 shown in the FIG. 7, the parts which comprise the axle assembly each can have a label attached thereto similar to the label 101, shown in the FIG. 11, or as simple as one of the lines on the label 101. The part labels are read into the computer 14 by the scanner 73 and the wedge reader 74 as one or more axle identification signals. The computer 14, or the computer 77, processes the identification signals information from the parts labels 101 by comparing it with a list of parts or axle identifier for each different type of axle to be manufactured. When a match between the identification signal and an axle identifier is detected, the computer compares the sensor signal representing the actual toe-in with a desired toe-in value associated with the matched axle identifier. If the actual value is within the desired value tolerance, a "good" axle signal is generated by the computer. If the actual value is outside the desired value tolerance, a "bad" axle signal is generated by the computer until the axle can be adjusted to be within the desired value tolerance.

In summary, the present invention concerns an apparatus for inspecting the toe-in setting of a pair of axle spindles mounted on a vehicle front axle assembly comprising a position sensor responsive to an actual position of a pair of axle spindles mounted on a vehicle front axle for generating a sensor signal representing an actual toe-in value, a reader means responsive to indicia on the axle for generating an axle identification signal representing a configuration of the axle, and a data processing means connected to the position sensor for reading the sensor signal and connected to the reader means for reading the axle identification signal. The data processing means stores a plurality of axle identifiers and associated desired toe-in values and compares the axle identification signal with the plurality of axle identifiers. Upon detecting a match, the data processing means compares the sensor signal with the associated desired toe-in value for generating one of a "good" axle signal and a "bad" axle signal.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for inspecting the toe-in setting of a pair of axle spindles mounted on a vehicle front axle assembly comprising:
   means for engaging a pair of axle spindles mounted on a vehicle front axle;
   a position sensor mounted on said means for engaging and responsive to an actual position of the pair of axle spindles for generating a sensor signal representing an actual toe-in value;

reader means responsive to indicia on the axle for generating an axle identification signal representing a configuration of the axle; and data processing means connected to said position sensor for reading said sensor signal and connected to said reader means for reading said axle identification signal, said data processing means storing a plurality of axle identifiers and associated desired toe-in values, said data processing means comparing said axle identification signal with said plurality of axle identifiers and, upon detecting a match, comparing said sensor signal with the associated desired toe-in value for generating one of a "good" axle signal and a "bad" axle signal.

2. The apparatus according to claim 1 wherein said means for engaging a pair of clamping assemblies adapted to engage the axle spindles; an elongated frame member having one of said clamping assemblies fixedly attached to an outer end thereof; a pivot bracket attached to said frame member and having the other one of said clamping assemblies pivotally attached thereto; an arc arm coupled for co-rotation with said other clamping assembly; a position indicator mounted on said arc arm and having a plurality of indicator marks formed thereon; and said position sensor mounted on said frame member for reading said indicator marks whereby when said clamping assemblies engage a pair of axle spindles of a vehicle axle, said position sensor generates said sensor signal to indicate the toe-in setting of the spindles.

3. The apparatus according to claim 1 wherein said indicia is a bar code label and said reader means is a bar code reader.

4. The apparatus according to claim 1 wherein said data processing means is a personal computer having a memory for storing said axle identifiers and said associated desired toe-in values.

5. The apparatus according to claim 1 including display means connected to said data processing means and responsive to said "good" and "bad" axle signals for generating a visual display for each of said "good" and "bad" axle signals.

6. The apparatus according to claim 5 wherein said visual displays include a message area and a signal area.

7. The apparatus according to claim 6 wherein said message area exhibits a verbal message.

8. The apparatus according to claim 6 wherein said signal area exhibits a flashing color.

9. The apparatus according to claim 1 including a printer connected to said data processing means for printing a label to be applied to the axle when said "good" axle signal is generated.

10. The apparatus according to claim 9 wherein said data processing means stores manufacturing information associated with said axle identifiers and said printer prints said manufacturing information on said label.

11. The apparatus according to claim 10 wherein said manufacturing information includes a customer part number.

12. The apparatus according to claim 10 wherein said printer prints said manufacturing information as a bar code.

13. The apparatus according to claim 10 wherein said manufacturing information includes a manufacturing line number and a sequence number.

14. The apparatus according to claim 10 wherein said manufacturing information includes a supplier number.

15. An apparatus for inspecting the toe-in setting of a pair of axle spindles on a vehicle front axle assembly comprising:

a pair of clamps adapted to engage axle spindles;

an elongated frame member having one of said clamps attached to an outer end thereof;

a pivot bracket having the other one of said clamps pivotally attached thereto;

an arc arm connected for co-rotation with said other clamp;

one of a position indicator and a position sensor mounted on said frame member and the other of said position indicator and said position sensor mounted on said arc arm whereby when said clamps engage a pair of axle spindles of a vehicle axle, a position of said position indicator with respect to said position sensor indicates a toe-in setting of the spindles which is generated by said position sensor as an actual toe-in value signal;

reader means responsive to indicia on the axle for generating an axle identification signal representing a configuration of the axle; and data processing means connected to said position sensor for receiving said actual toe-in value and to said reader means for receiving said axle identification signal, said data processing means storing a desired toe-in value associated with said axle identification signal and comparing said actual toe-in value with said desired toe-in value to determine a toe-in variation representing one of a "good" and a "bad" axle; and display means connected to said data processing means and responsive to said toe-in variation for generating a visual message indicating a corresponding one of a "good" and a "bad" axle.

16. A method of inspecting a toe-in value for a vehicle front axle comprising the steps of:

a. providing a fixture having a pair of clamping assemblies, a position indicator attached to one of the clamping assemblies and a position sensor attached to the other one of the clamping assemblies;

b. closing the clamping assemblies to engage the spindles of an axle and force relative rotation between the clamping assemblies;

c. generating an actual toe-in value signal from the position sensor representing the position of the position indicator and the toe-in setting of the spindles;

d. reading indicia on the axle and generating an axle identification signal representing a configuration of the axle;

e. comparing said actual toe-in value signal with a desired toe-in value associated with said axle identification signal to determine a toe-in variation; and f. generating a visual message indicating a corresponding one of a "good" and a "bad" axle based upon said toe-in variation.

17. The method according to claim 16 including a step of storing a plurality of said axle identification signals each with an associated desired toe-in value and comparing said axle identification signal generated in the step d. with said stored axle identification signals to obtain one of said desired toe-in values for use in the step e.

18. The method according to claim 17 wherein the step f. includes generating said visual message with a message area and a signal area.

19. The method according to claim 18 wherein said message area exhibits a verbal message and said signal area exhibits a flashing color.

20. The method according to claim 16 including a step of printing a label with manufacturing information associated with the axle and applying said label to the axle when said "good" axle visual message is generated.

* * * * *

UNITED STATES PATENT AND TRADEMARK OFFICE
CERTIFICATE OF CORRECTION

PATENT NO. : 5,249,364
DATED : October 5, 1993
INVENTOR(S) : Craig A. Bishop It is certified that error appears in the above-identified patent and that said Letters Patent is hereby corrected as shown below:

On the title page, item [75] Inventor: "Craig A. Bishop, Fort Wayne, Indiana" should read --[75] Inventors: "Paul L. Brosher, Hillard Ohio; Craig A. Bishop, North Canton, Ohio--.

Column 11. line 16 (claim 2), after "engaging" insert --includes--.

Signed and Sealed this

Seventeenth Day of May, 1994

Attest:

BRUCE LEHMAN

Attesting Officer     Commissioner of Patents and Trademarks